April 6, 1948. T. G. BECKETT 2,439,282
FLOAT VALVE
Filed April 10, 1944
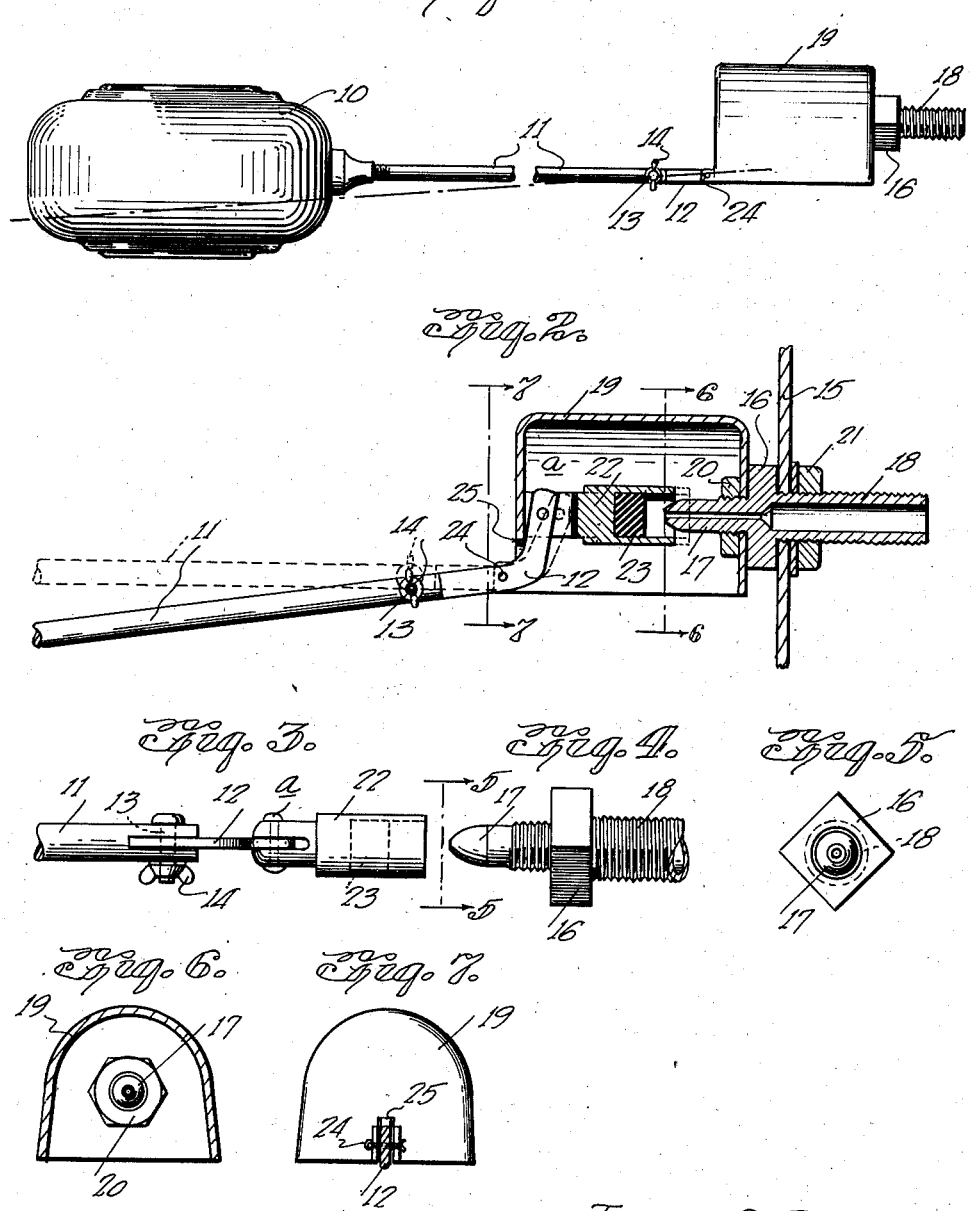
THOMAS G. BECKETT
INVENTOR.
BY
ATTORNEY Patented Apr. 6, 1948

2,439,282

UNITED STATES PATENT OFFICE 2,439,282

FLOAT VALVE

Thomas G. Beckett, Dallas, Tex.

Application April 10, 1944, Serial No. 530,265

1 Claim. (Cl. 137—104)

This invention relates to valves and particularly to the type of valve controlled by a float.

The principal object of the invention is to provide a valve especially suited for use in evaporative cooling apparatus, humidifiers and the like whose design and construction is such as to require but few parts and minimum attention in operation and is therefore exceptionally economical both from the standpoint of manufacture and maintenance. Moreover, and of equal importance is the provision in the assembly of a baffle overlying the valve orifice which deflects the liquid entering a tank or reservoir downwardly and further, the provision of means to effect ready detachment or adjustment of the float arm next adjacent to the valve, all of the elements of the combination being supported with respect to the tank or reservoir by the valve shank which extends through and is secured in the wall of such tank or reservoir.

With the foregoing objects as paramount, the invention has further reference to certain features of accomplishment which will become apparent as the description proceeds, taken in connection with the accompanying drawings wherein:

Figure 1 is a side elevational view of the invention with an attendant float.

Figure 2 is a side elevational view of the valve in longitudinal section.

Figure 3 is a fragmentary view of the float arm and showing a plan view of the valve closure.

Figure 4 is a detail view of the valve nipple.

Figure 5 is an end view of the valve nipple taken on line 5—5 on Figure 4.

Figure 6 is a view in vertical section taken on line 6—6 on Figure 2, and

Figure 7 is an end elevational view of the hood or baffle taken on line 7—7 on Figure 2.

Continuing with a more detailed description of the drawing, reference is primarily made to Figure 1 wherein numeral 10 denotes a float of conventional design, mounted on an arm 11. One end of the arm 11 is bifurcated to receive an end of a substantially L-shaped and flat member 12 which is firmly held against displacement by a bolt 13 passing through the member 12 and the bifurcated end of the arm 10. A wing nut 14 is threaded onto the bolt to facilititate its removal and replacement.

It is important to observe that in the interest of economy in manufacture, the parts of the valve are constructed from bar stock and that the parts of the valve, four in number, including the actuating arm and hood, are all supported from the valve shank which, in turn, is supported by the wall 15 (Fig. 2) of the tank or reservoir in which the valve is mounted. There are no springs or brackets to get out of order or to collect dirt.

The valve shank is tooled to define a boss 16, a male element 17 forming a nipple or nozzle, threaded partway of its length and a threaded service extension 18 to receive a liquid supply pipe or hose, not shown.

An arcuate shaped hood or baffle 19 is provided with an aperture in one end to receive the nipple 17 and once in place, the baffle bears against the boss 16 and is held in this position by a nut 20, mounted on the threaded portion of the nipple. A nut 21 threaded onto the extension 18 exteriorly of the tank wall 15 secures the shank of the valve rigidly in the tank.

The baffle 19, being thus held in place, overlies and conceals the elements of the valve and prevents water from spraying upwardly out of the tank when the level in the tank drops to open the valve.

Cooperating with the nipple 17 is a plunger or female element 22, in the forward cylindrical end of which is arranged a pad of resilient material forming a seat 23 for the valve nipple 17, while its rearmost end is bifurcated to pivotally receive at $a$ an end of the L-shaped coupling member 12 of the actuating arm 11. This member is pivoted at 24 to the baffle 19 on each side of a slot 25 in the end of the baffle accommodating the member 12.

In operation, as the level of liquid in the tank or reservoir changes the position of the float 10, the coupling member 12 will be caused by the float arm 11 to move to effect axial movement of the plunger 22. When the level of the liquid rises to a predetermined point, the plunger will move to embrace further the nipple and the seat 23 will bear flush against the orifice in the nipple, cutting off further inflow of liquid. Conversely, when the liquid level in the tank drops, the plunger will move away from the nipple to open the same to flow of liquid into the tank, the baffle 19 deflecting the same downwardly.

Manifestly, the construction as shown and described is capable of some modification and such modification as may be construed to fall within the scope and meaning of the appended claim is also considered to be within the spirit and intent of the invention.

What is claimed is:

In a float valve, the combination comprising a body composed of a single piece of stock having an axial passage therethrough and shaped to define a threaded shank at one end and a partially threaded nipple at the other end with a boss intermediate the ends of said body, a hollow plunger bifurcated at one end and telescopically supported by said nipple for longitudinal displacement, a valve seat in said plunger engageable with said nipple to close the passage, a hood closed except at its bottom and supported on the threaded portion of said nipple to overlie said partially threaded nipple and plunger and forming a movement limiting means for said plunger, said hood having a slot in one end, a substantially L-shaped member pivoted in the slot of said hood and at one end to the bifurcated end of said plunger and operative to move said plunger, a float carrying arm connected to the opposite end of said L-shaped member, and means for adjusting said arm at its connection with said L-shaped member.

THOMAS G. BECKETT.

REFERENCES CITED

The following references are of record in the file of this patent:

UNITED STATES PATENTS

| Number | Name | Date |
|---|---|---|
| 525,870 | Stevens | Sept. 11, 1894 |
| 909,409 | Herschler | Jan. 12, 1909 |
| 1,112,533 | Griffiths | Oct. 6, 1914 |
| 1,542,321 | Renner | June 16, 1925 |
| 1,804,093 | Estep | May 5, 1931 |
| 1,887,235 | Cornelius | Nov. 8, 1932 |
| 2,059,359 | Karges | Nov. 3, 1936 |
| 2,263,142 | Pratt | Nov. 18, 1941 |
| 2,292,407 | Skerritt | Aug. 11, 1942 |

FOREIGN PATENTS

| Number | Country | Date |
|---|---|---|
| 1,374 | Great Britain | Jan. 12, 1894 |
| 19,995 | Great Britain | Sept. 21, 1914 |